United States Patent
Arakawa et al.

(10) Patent No.: US 9,712,023 B2
(45) Date of Patent: Jul. 18, 2017

(54) SLIP RING DEVICE

(71) Applicant: TOYOTA JIDOSHA KABUSHIKI KAISHA, Toyota-shi (JP)

(72) Inventors: Kazuya Arakawa, Fujinomiya (JP); Yuya Takahashi, Susono (JP); Daisuke Tokozakura, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 300 days.

(21) Appl. No.: 14/437,957

(22) PCT Filed: Oct. 29, 2013

(86) PCT No.: PCT/JP2013/079308
§ 371 (c)(1),
(2) Date: Apr. 23, 2015

(87) PCT Pub. No.: WO2014/069476
PCT Pub. Date: May 8, 2014

(65) Prior Publication Data
US 2015/0280534 A1    Oct. 1, 2015

(30) Foreign Application Priority Data

Oct. 30, 2012  (JP) ................................ 2012-239498

(51) Int. Cl.
| H02K 9/28 | (2006.01) |
| H02K 13/00 | (2006.01) |
| H01R 39/08 | (2006.01) |
| H02K 9/02 | (2006.01) |

(52) U.S. Cl.
CPC ........... *H02K 13/003* (2013.01); *H01R 39/08* (2013.01); *H02K 9/02* (2013.01); *H02K 9/28* (2013.01)

(58) Field of Classification Search
CPC ........... H02K 9/28; H02K 13/003; H02K 9/26
USPC ......................................... 310/231–233, 227
See application file for complete search history.

(56) References Cited

U.S. PATENT DOCUMENTS

| 4,410,821 A * | 10/1983 | Kurt ....................... H01R 39/08 310/227 |
| 7,307,367 B2 * | 12/2007 | Angerpointner ....... H01R 43/10 310/232 |
| 2009/0091208 A1 * | 4/2009 | Yu .......................... H01R 39/08 310/232 |
| 2011/0210644 A1 * | 9/2011 | Krogh .................... H01R 39/08 310/232 |

(Continued)

FOREIGN PATENT DOCUMENTS

| JP | 60-066275 U | 5/1985 |
| JP | 63-083962 U | 6/1988 |

(Continued)

OTHER PUBLICATIONS

International Search Report issued Jan. 14, 2014 in PCT/JP2013/079308 filed Oct. 29, 2013.

*Primary Examiner* — Thanh Lam

(74) *Attorney, Agent, or Firm* — Oblon, McClelland, Maier & Neustadt, L.L.P.

(57) ABSTRACT

A slip ring device (5) includes ring members (10a-10c) that rotate along with an input shaft, and brushes that contact the ring members (10a-10c). The ring members (10a-10c) have surfaces (11a-11c) that contact the brushes, and a plurality of dimples are formed upon these surfaces (11a-11c).

4 Claims, 16 Drawing Sheets

(56) References Cited

U.S. PATENT DOCUMENTS

2012/0200194 A1* 8/2012 Schwery ................ H02K 9/28
　　　　　　　　　　　　　　　　　　　　　　310/227

FOREIGN PATENT DOCUMENTS

| JP | 04-109848 A | 4/1992 |
| JP | 2005-228522 A | 8/2005 |
| JP | 2010-119258 A | 5/2010 |
| JP | 2011-055661 A | 3/2011 |

* cited by examiner

D1<D3<D2

SLIP RING DEVICE

TECHNICAL FIELD

The present invention relates to a slip ring device that is applied to a rotating electrical machine including a rotation shaft.

BACKGROUND ART

A slip ring device is per se known that is capable of changing the force with which a brush of a rotating electrical machine is pressed against a ring that is installed upon the rotation shaft thereof, so that this force becomes smaller when the brush is not conducting current as compared to when it is conducting current (refer to Patent Document #1). Moreover, Patent Document #2 may be considered to have some relevance to the present invention.

CITATION LIST

Patent Literature

Patent Document #1: JP2011-55661A.
Patent Document #2: JP2005-228522A.

SUMMARY OF INVENTION

Technical Problem

Since, with the slip ring device of Patent Document #1, the pressing force of the brush is reduced when it is not conducting current, accordingly it is possible to reduce wear upon the brush, as compared to the case if the pressing on force is always constant. However, this device makes no contribution to reduction of wear upon the brush during conduction of current. Therefore, it would be desirable to suppress wear upon the brush, not only during non-conduction of current, but also during conduction of current.

Accordingly, the object of the present invention is to provide a slip ring device that can suppress wear upon the brush.

Solution to Technical Problem

The slip ring device of the present invention is a slip ring device that is applied to a rotating electrical machine including a rotation shaft, and comprises a ring member that rotates along with the rotation shaft of the rotating electrical machine and a brush that contacts against the ring member, wherein the ring member has a surface that contacts against the brush, and a plurality of dimples are formed on the surface.

Since the brush contacts the ring member while it is rotating, brush wear powder is generated due to friction between the ring member and the brush. If brush wear powder due to friction on the brush is present between the brush and the ring member, then this wear powder itself clumps together and grows, and in some cases brush wear is promoted by this growth. According to this slip ring device, it is possible to suppress the growth of the wear powder as described above, due to the fact that the brush wear powder is accumulated in some of the dimples that are formed on the surface of the ring member. Due to this it is possible to suppress wear on the brush, since promotion of brush wear is hampered.

As one aspect of the slip ring device of the present invention, it may be arranged for at least one of the plurality of dimples to have a size that can accommodate wear powder generated by friction between the ring member and the brush. According to this aspect, the possibility of the wear powder being captured by this dimple is increased.

As one aspect of the slip ring device of the present invention, if each of the plurality of dimples is considered as having an opening portion that has the same aperture area and that moreover opens to the surface in a circular shape, and the diameter of the opening portion is defined as being the dimple diameter, then it is possible to set the dimple diameter within the range of from ten times to a hundred times the average particle diameter of the wear powders. Since the dimple diameter is set within the range of from ten times to a hundred times the average particle diameter of the wear powder, accordingly the possibility of the wear powder being captured by the dimples is increased by yet a further level. Therefore, the beneficial effect of suppression of wear upon the brush due to the formation of the dimples on the ring member is enhanced.

As one aspect of the slip ring device of the present invention, if each of the plurality of dimples is considered as having an opening portion that has the same aperture area and that moreover opens to the surface in a circular shape, and the diameter of the opening portions is defined as being the dimple diameter, then: a first unit, a second unit, and a third unit may be provided, each including one ring member and one brush, and moreover, in order along the axial direction of the rotation shaft, these units may be arranged upon the rotation shaft in the order of the first unit, the second unit, and the third unit; with the dimple diameter of the ring member included in the second unit being larger than the dimple diameter of the ring member included in the first unit, and moreover being larger than the dimple diameter of the ring member included in the third unit.

Since the second unit is sandwiched between the first unit and the third unit, accordingly it is more difficult for heat to be dissipated from that second unit, as compared to the first unit or to the third unit. Therefore the surface temperature of the brush of the second unit is the highest. It is per se known that the size of the brush wear powder is proportional to the surface temperature of the brush and the ring member. Accordingly, the size of the brush wear powder produced in the second unit is larger, as compared to the brush wear powder produced in the other units. According to this aspect of the present invention, since the dimple diameter of the ring member included in the second unit is larger than the dimple diameters of the ring members included in the other units, accordingly the possibility of the wear powder created by the second unit being captured in its dimples is higher, as compared to the case if the dimple diameters of the units were all the same. Therefore, the disparities in the progression of brush wear between the three units become smaller. Due to this, the management of brush wear becomes easy, because the deviations of brush wear between the three units are reduced.

In this aspect of the present invention, the dimple diameters of the ring members included in each of the first unit, the second unit, and the third unit may be set within the range of from ten times to a hundred times the average particle diameter of the wear powder. Since the dimple diameters are set within the range of from ten times to a hundred times the average particle diameter of the wear powder, therefore the possibility of capture of the wear powder by the dimples is increased by yet a further level.

Accordingly, the beneficial effect of the formation of the dimples in the ring member for suppression of brush wear is enhanced.

Moreover, there may be further included a cooling device that flows air in the direction from the first unit via the second unit toward the third unit and cools the first unit, the second unit, and the third unit, with the dimple diameter of the ring member included in the first unit being smaller than the dimple diameter of the ring member included in the third unit.

Since the air flowed by the cooling device proceeds from the first unit via the second unit toward the third unit, accordingly the surface temperature of the brush of the first unit becomes lower, as compared to the surface temperature of the brush of the third unit. Accordingly, the surface temperatures of the brushes of the various units become higher in the order: the first unit, the third unit, and the second unit. And, since the dimple diameter of the ring member included in the first unit is smaller than the dimple diameter of the ring member included in the third unit, accordingly the magnitudes of the dimple diameters agree with the levels of the surface temperatures of the units. Therefore, as compared to a case in which the dimple diameter of the ring member included in the first unit and the dimple diameter of the ring member included in the third unit are the same, the disparities in the progression of brush wear between the three units become yet smaller. Due to this, the deviations of brush wear between the three units are further reduced.

Furthermore, the wear powder generated by the first unit is ejected by the air flowed by the cooling device, and there is a possibility that this wear powder may get into the second unit and the third unit. However, since the wear powder generated by the first unit is smaller than the wear powder generated by the other units, and moreover the dimple diameter of the second unit and the dimple diameter of the third unit are larger than the dimple diameter of the first unit, accordingly it becomes possible for wear powder that has been discharged from the first unit and that has entered into the second unit or into the third unit to be captured by the dimples of those units. Therefore it is difficult for any influence to be received from the wear powder generated by the other units.

And, as one aspect of the slip ring device of the present invention, there may be further provided a cooling device that flows air in the axial direction of the rotation shaft and cools the ring member and the brush, with at least one of the plurality of dimples having an opening portion, a bottom portion, and an inner wall that is formed in the shape of a curved surface from the opening portion to the bottom portion, and moreover with the curvature of the inner wall from the opening portion to the bottom portion being formed so as to be smaller at the upstream side of the flow direction of air flowed by the cooling device, as compared to the downstream side. Since, according to this aspect of the present invention, the curvature of the inner wall of the dimple when the air flowing over the surface of the ring member enters into the dimple is small, accordingly the air flowing towards the dimple does not easily separate at the edge of the opening portion of the dimple, and can easily get as far as the bottom portion of the dimple. Due to this, it becomes easy for wear powder captured by the dimple to be ejected to the exterior by the flow of air. Accordingly, it is possible for wear powder in the bottom portion of the dimple to be ejected before a large amount thereof has accumulated.

It should be understood that the term "dimple" in this specification and in the Claims refers to a formation that is concaved, and this formation may be of any shape.

DESCRIPTION OF EMBODIMENTS (Embodiment #1)

Figure 1:
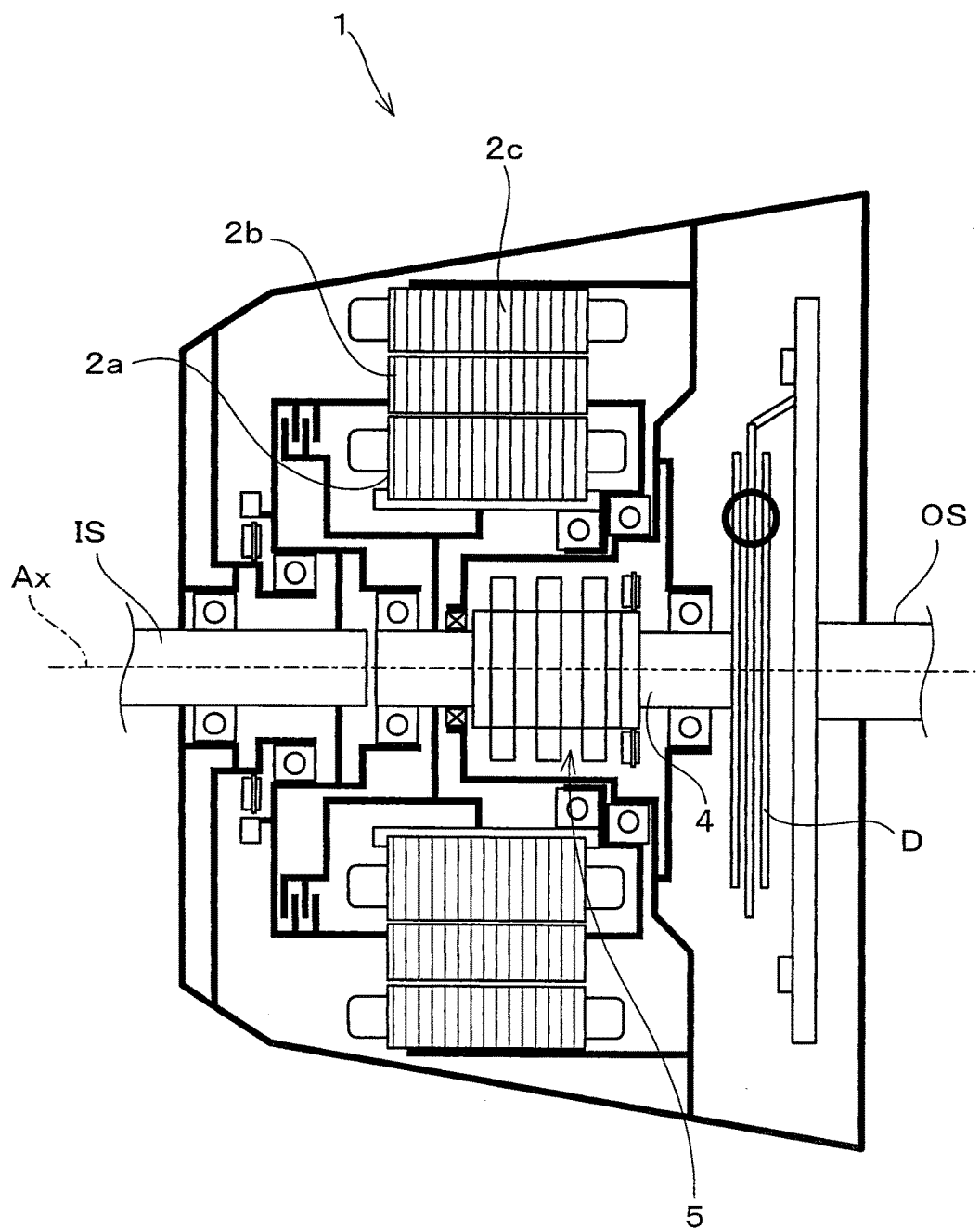
FIG. 1 is a figure schematically showing a composite motor to which a slip ring device according to an embodiment of the present invention is installed.

As shown in FIG. 1, a composite motor 1 as a rotating electrical machine is employed by being installed to a drive device of a vehicle such as an automobile. This composite motor 1 comprises a winding rotor 2a and a magnet rotor 2b that are arranged coaxially so as to be rotatable with respect to one another. A stator 2c is disposed around the outside of these rotors 2a and 2b. The composite motor 1 is mounted between an engine and an automatic transmission, not shown in the figures, that are provided to a drive device. The composite motor 1 serves the function of amplifying the torque of the engine that is inputted to the winding rotor 2a, and transmitting the resulting amplified torque to the automatic transmission. A slip ring device 5 is a three-phase AC type slip ring device, and is used for conducting current between the winding rotor 2a and an inverter not shown in the figures. This slip ring device 5 is installed on the external surface of an input shaft 4, which is a rotation shaft that rotates together with the winding rotor 2a. The torque from the engine is inputted to the input shaft 4 via an output shaft OS of the engine and via a damper D. The torque outputted from the composite motor 1 is transmitted to an input shaft IS of the automatic transmission.

Figure 2:
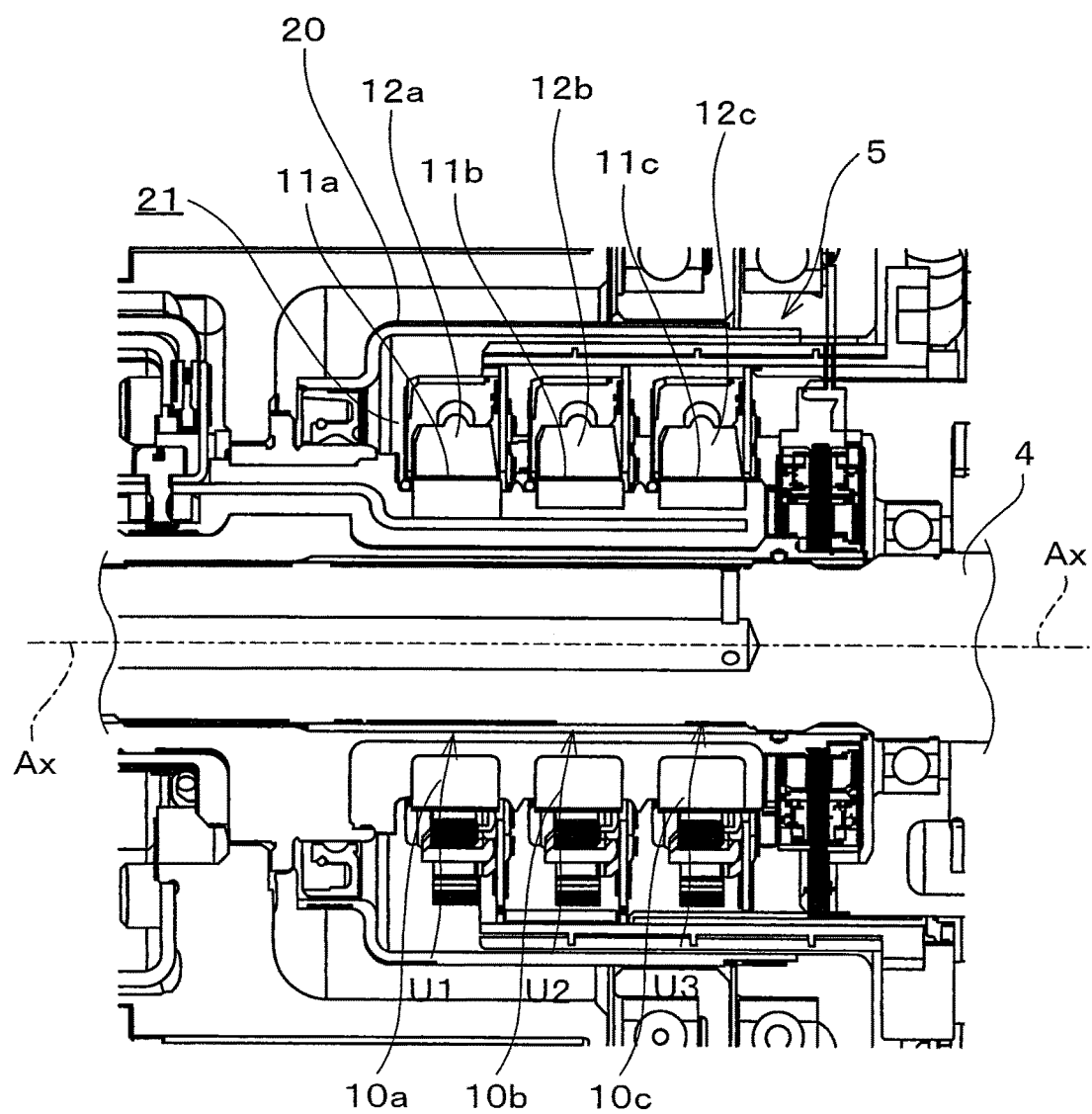
FIG. 2 is a sectional view showing the slip ring device and surrounding structures.
Figure 3:
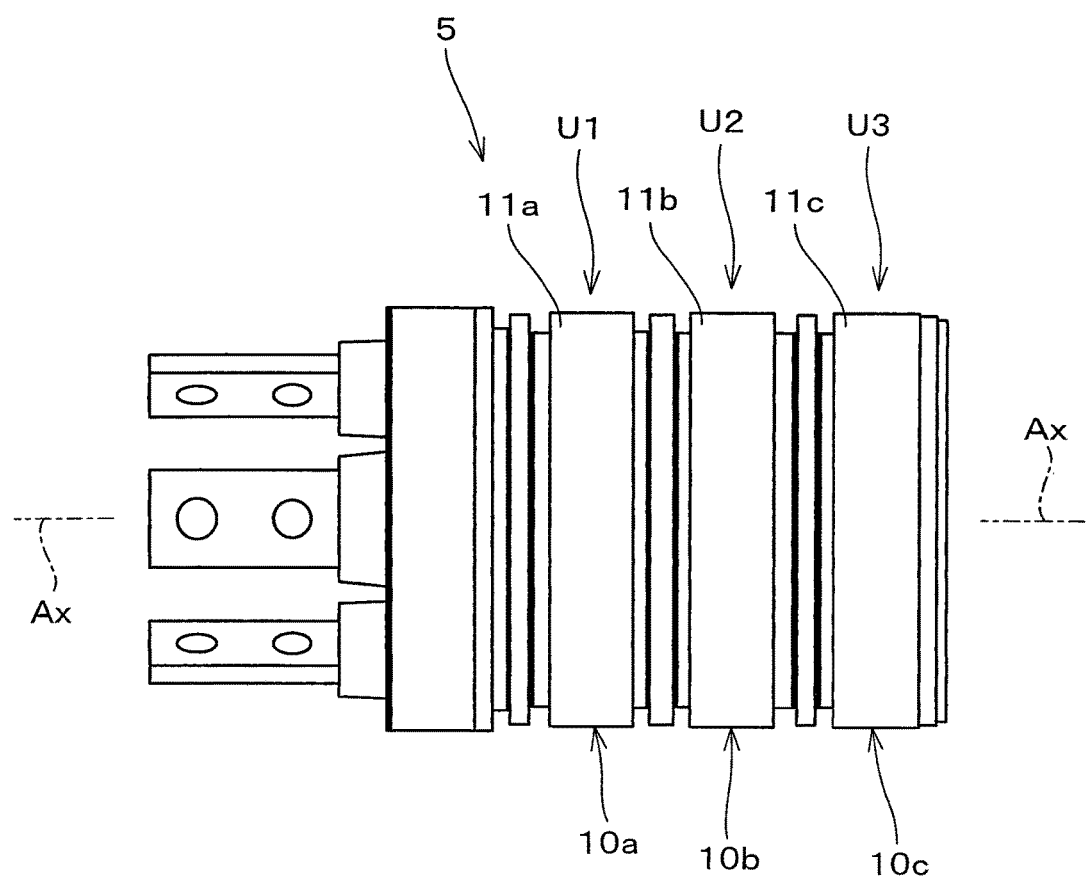
FIG. 3 is a figure schematically showing a ring member included in the slip ring device.

As shown in FIGS. 1 through 3, the slip ring device 5 comprises three units U1 through U3 that correspond to the three phases of the winding rotor 2a, and these three units U1 through U3 are stacked along the direction of the axis Ax of the input shaft 4. The first unit U1 comprises a ring member 10a that is installed over the external surface of the input shaft 4, a brush 12a that contacts the surface 11a of the ring member 10a, and a brush holder 13a that holds the brush 12a. In a similar manner, the second unit U2 comprises a ring member 10b, a brush 12b, and a brush holder 13b, and the third unit U3 comprises a ring member 10c, a brush 12c, and a brush holder 13c. The ring members 10a through 10c are made from gunmetal. And the brushes 12a through 10c are made from Cu—C alloy. Due to this, wear caused by the ring members 10a through 10c contacting and sliding against the brushes 12a through 12c only takes place upon the brushes 12a through 12c, in a one-sided manner.

Figure 4:
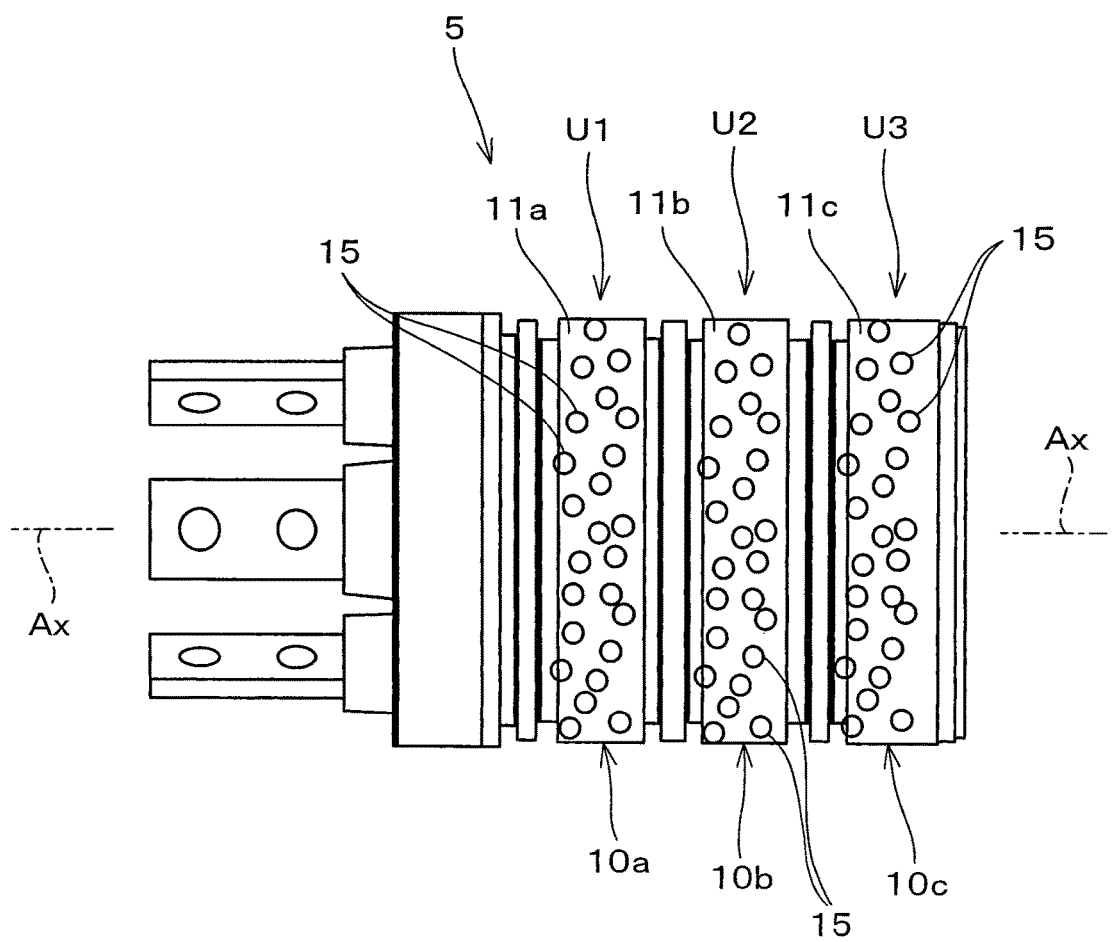
FIG. 4 is a figure schematically showing the surface of the ring member of FIG. 3.
Figure 5:
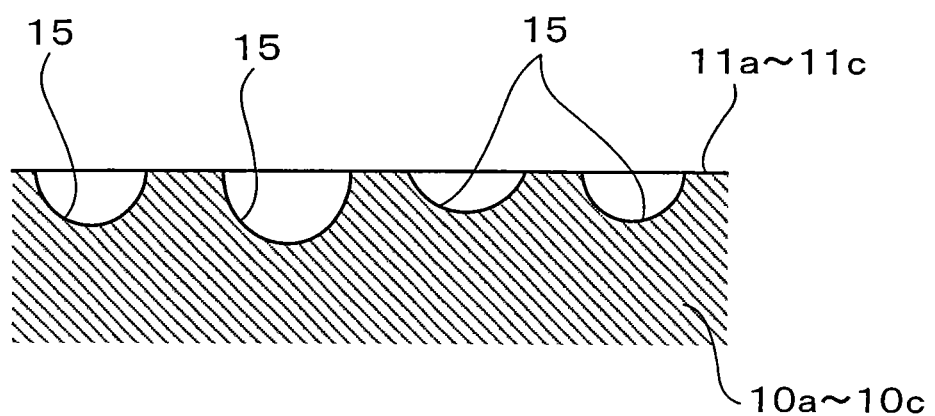
FIG. 5 is an enlarged sectional view schematically showing the state of the surface of the ring member.

As shown in FIG. 4, each of the surface 11a of the ring member 10a, the surface 11b of the ring member 10b, and the surface 11c of the ring member 10c is formed with a plurality of dimples 15. As shown in FIG. 5, each of these dimples 15 is a small hollow that is formed upon the surface 11a through 11c. It should be understood that, in order to aid visual understanding, in FIGS. 4 and 5, the plurality of dimples 15 are shown as enlarged to greater than their actual sizes, and moreover are shown schematically. The dimples 15 are manufactured by a per se known shot peening method. The sizes of the dimples 15 are controlled by adjusting the projection speed of the particles that are used in the shot peening method, the space over which they are projected, and their diameters. It should be understood that it would also be possible to manufacture the dimples 15 by a laser processing method, instead of by a shot peening method. If a laser processing method is employed, then the size of the dimples 15 may be adjusted by adjusting the intensity of the laser beam, the angle at which it is irradiated, and its spot diameter. In this embodiment, at least one of the plurality of dimples 15 is formed of such a size as to be capable of accumulating wear powder from the brushes 12a through 12c. This wear powder is created by friction between the brush 12a and the surface 11a of the ring member 10a, by friction between the brush 12b and the surface 11b of the ring member 10b, and by friction between the brush 12c and the surface 11c of the ring member 10c.

It is ideal for all of the plurality of dimples 15 to be formed of the same shape and size, and to be adjusted so that they can accumulate the wear powder satisfactorily. However, there is a limit to the processing accuracy available with existing processing methods such as the shot peening method and so on. Nevertheless, each of the plurality of dimples 15 will be regarded as having the same opening area and moreover as having an opening portion that opens in the same circular shape in the surface 11a through 11c, and the diameter of the opening portion will be defined as being the dimple diameter. And the dimple diameter is set so as to be with the range of from ten to a hundred times the average particle diameter of the wear powders. In this embodiment, based upon the test results given below, the dimple diameter is set within the range from 0.1 μm to 15.0 μm.

Operational testing of the composite motor 1 to which a slip ring device 5 was installed was performed under the test conditions described below, with the wear powder that was generated being measured with a conventional particle size distribution analyzer. The result was that the particle diameters of the wear powder were distributed within the range of 0.01 μm to 0.15 μm. When the dimple diameter was too small, the dimples easily became clogged by the wear powder; and conversely, when the dimple diameter was too large, the contact area between the brush and the ring member became smaller, which was a hindrance to the transmission of electricity. Accordingly it is considered that setting the diameter of the dimples to from ten times to a hundred times the measured particle diameter value range of the wear powder does not substantially hinder the transmission of electricity and also enhances the possibility of capturing the wear powder with the dimples 15, and accordingly the diameter of the dimples was set within the range of from 0.1 μm to 15.0 μm.

(The Test Conditions)

(1) Testing was performed with the rotational speed of the ring member (i.e. the rotational speed of the engine output shaft OS) within the range of from 0 to 4000 rpm, and the range normally used was 2 to 3000 rpm.

(2) The electrical current applied during testing was set to within the range of from 0 to 30 A.

(3) The brushes used for testing were made from Cu—C alloy, and the material for the ring members was gunmetal.

By setting the magnitude of the diameter of the dimples as described above, most of the dimples 15 were formed of a size capable of accumulating the wear powder. In this first embodiment, the dimple diameter was set to the same value for all the units U1 through U3. It should be understood that the average particle diameter of the wear powder means the particle diameter corresponding to the maximum value of the measured particle size distribution, when a suitable sample amount was acquired of the wear powder that was created and the particle size distribution of this sample was measured using a conventional particle size distribution analyzer.

Figure 6:
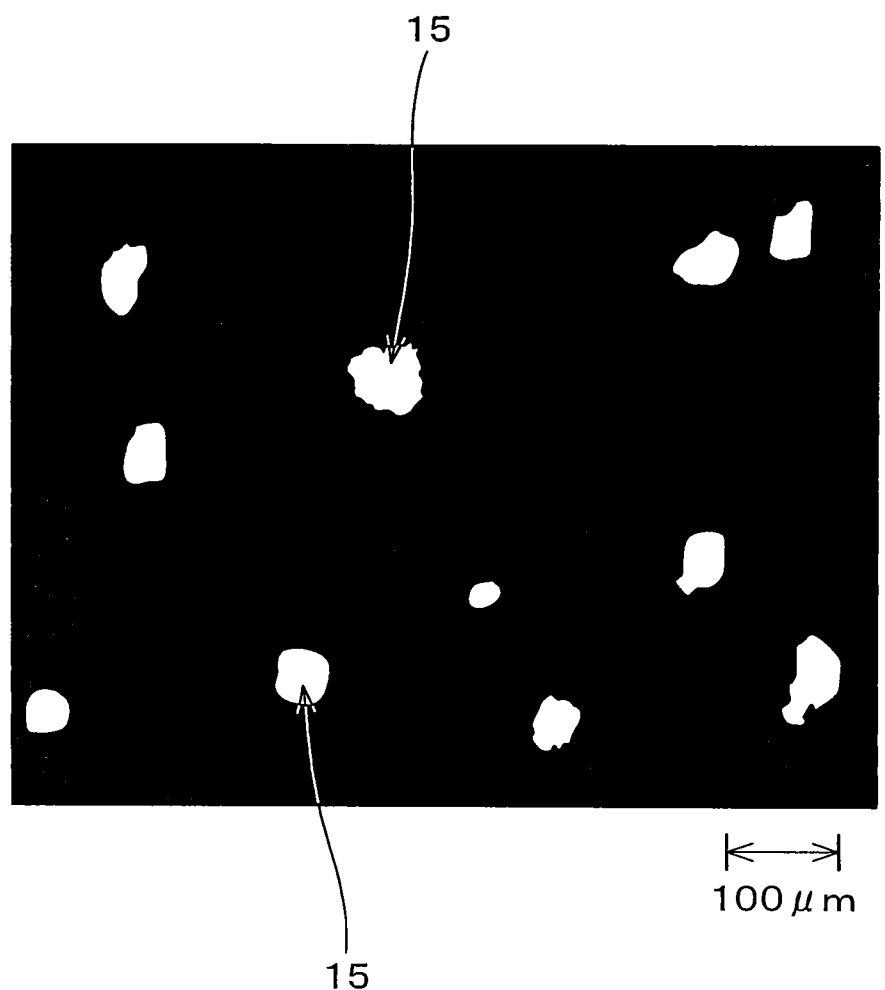
FIG. 6 is a figure showing an image obtained after an image of the surface of a ring member has been subjected to binarization processing.

The method by which the dimple diameter was determined was, in concrete terms, as follows. First, using an image capture means such as an optical microscope or the like, an image was captured of some region on the surface 11a through 11c of the ring member 10a through 10c. And, as shown in FIG. 6, this captured image was subjected to binarization processing, so that the portions where the dimples 15 were formed became white, while the other portions became black. Next, on the basis of this image obtained by binarization processing, the number n of dimples 15 present in this image and the sum total S of their aperture areas were both calculated. In the case shown in FIG. 6, n=11. Here, it was supposed that the plurality of dimples 15 were distributed over the surface 11a through 11c in a uniform manner, and moreover it is considered that all of the plurality of dimples 15 had circular shaped opening portions of the same area. Due to this, the aperture area s of a single dimple 15 may be calculated as being s=S/n. The diameter of a circle having the same area as this aperture area s is the dimple diameter described above. The dimple diameter that has been defined in this manner was taken as a characteristic that determines the size of the dimples 15. In connection with the depth of the dimples 15, it should be understood that it is hypothesized that the inner surfaces of all of the plurality of dimples 15 were formed as hemispherical surfaces, so that the dimple depth was defined as being half of the dimple diameter.

Figure 7:
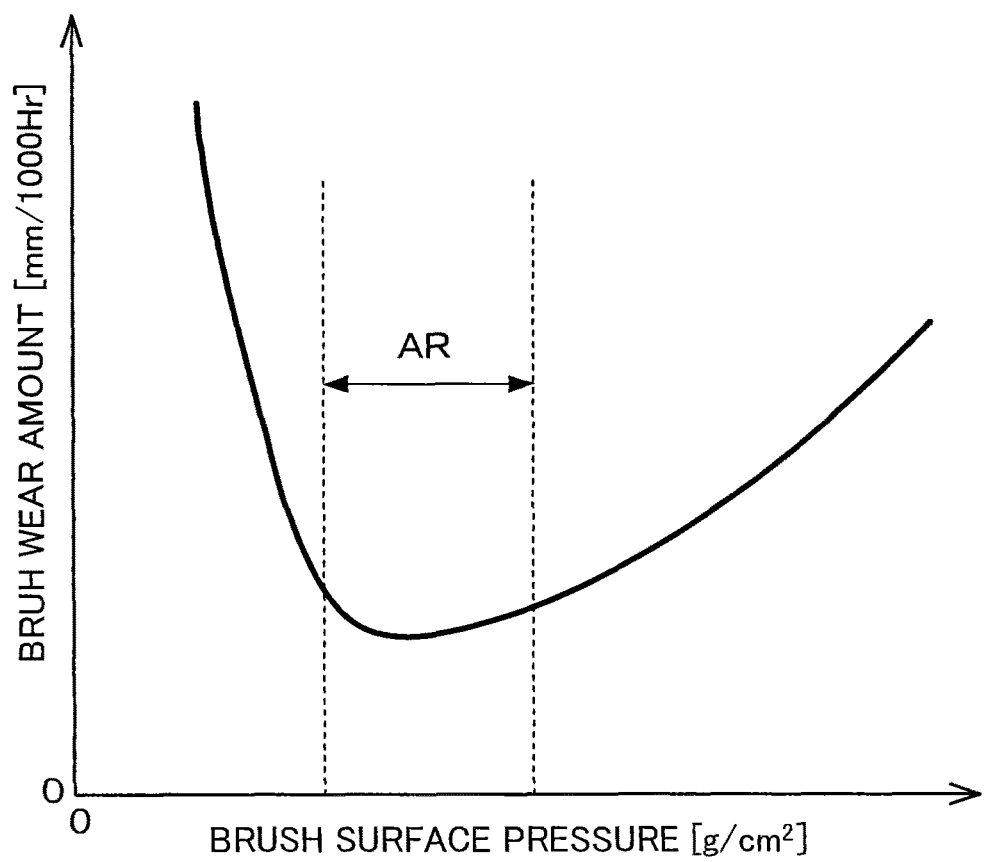
FIG. 7 is a figure showing a relationship between brush wear amount and brush surface pressure.

The surface pressure with which the brush 12a of the first unit U1 is pressed against the ring member 10a, the surface pressure with which the brush 12b of the second unit U2 is pressed against the ring member 10b, and the surface pressure with which the brush 12c of the third unit U3 is pressed against the ring member 10c, are each determined in consideration of the presence of the plurality of dimples 15. As shown in FIG. 7, the relationship between the brush surface pressure and the brush wear amount is given by a quadratic curve that is convex downward. Due to this, there is some brush surface pressure at which the brush wear amount becomes minimum. As the brush surface pressure becomes lower, the electrical wear increases and becomes dominant; and, as the brush surface pressure becomes higher, the mechanical wear increases and becomes dominant. Thus, the brush surface pressure for each of the units U1 through U3 is set so as to fall within a range AR that includes the brush surface pressure that yields the minimum value of brush wear amount.

If the force pressing upon the brush 12a through 12c is termed F and the sliding area where the brush 12a through 2c and the ring member 10a through 10c slide against one another is termed Ar, then the brush surface pressure is defined as being F/Ar. The sliding area Ar is defined as being Ar=$(1-\alpha)\cdot A$. Here, A is the sliding area when the dimples 15 are not considered, in other words the sliding area if it is hypothesized that the dimples 15 have not been formed on the surface 11a through 11c. And $\alpha$ is the dimple area ratio.

The dimple area ratio $\alpha$ means the proportion of the total aperture area of the dimples 15 to the sliding area A. In a similar manner to the case when calculating the dimple diameter described above, this dimple area ratio $\alpha$ is calculated on the basis of information obtained from the image that has been subjected to binarization processing (refer to FIG. 6), under the assumption that the plurality of dimples 15 are uniformly distributed over the surface 11a through 11c. That is to say, if the sum total of the aperture area of all the dimples 15 present within the image of FIG. 6 is termed S, and the area of the entire image of FIG. 6 is termed Sw, then the dimple area ratio $\alpha$ is calculated according to $\alpha=S/Sw$.

The brush surface pressure is a function of the dimple area ratio $\alpha$, and the dimple area ratio $\alpha$ is a function of the size and the number of the dimples. Accordingly, the upper limit for the number of the dimples 15 and the upper limit for the dimple diameter are set so that, as a reference, the brush surface pressure is within the range AR in FIG. 7 described above. By setting the upper limit for the number of the dimples 15 and the upper limit for the dimple diameter in this manner, it is possible to form the dimples 15 so as to suppress increase of the brush wear amount.

Figure 8:
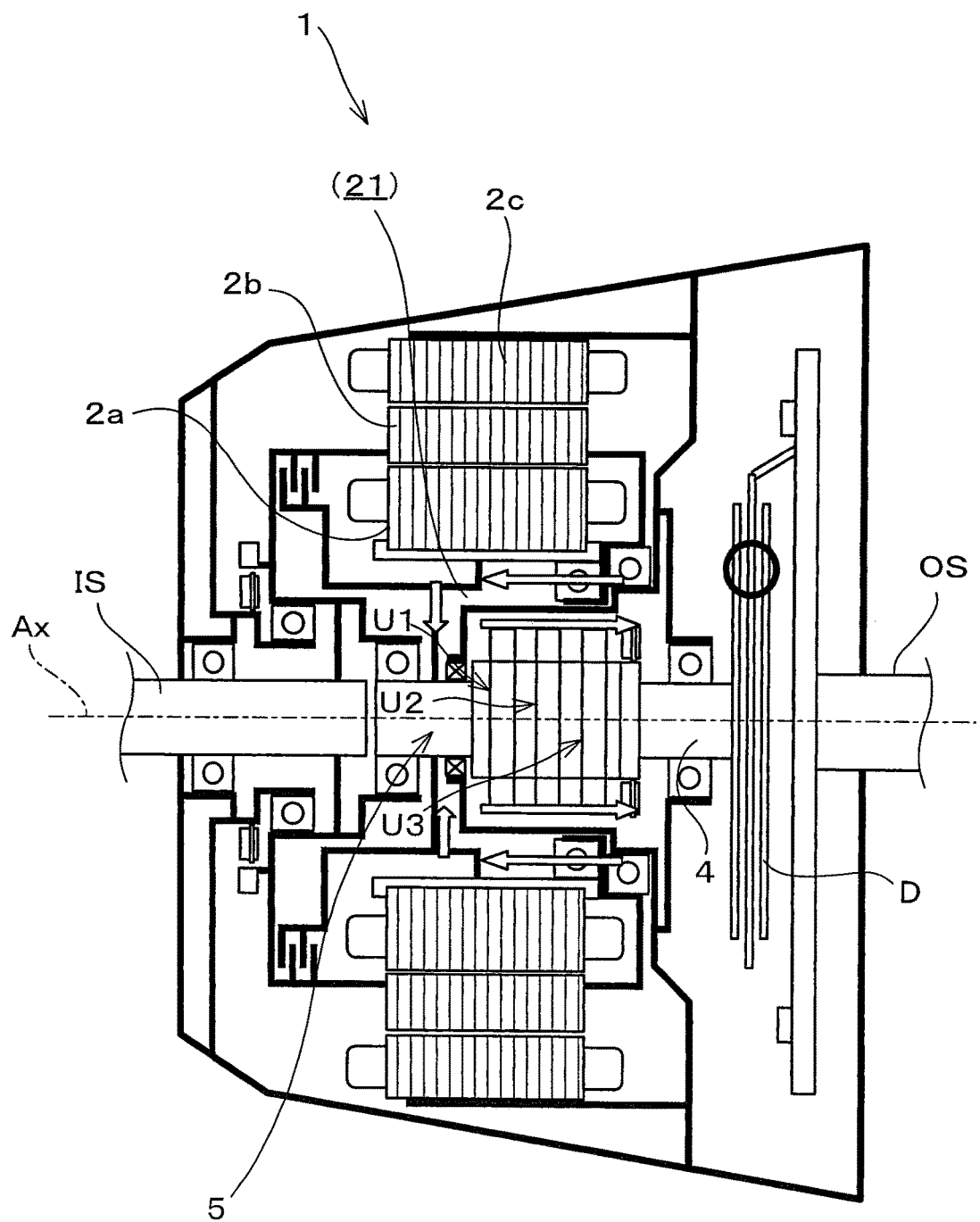
FIG. 8 is an explanatory figure for explanation of an air flow.
Figure 9:
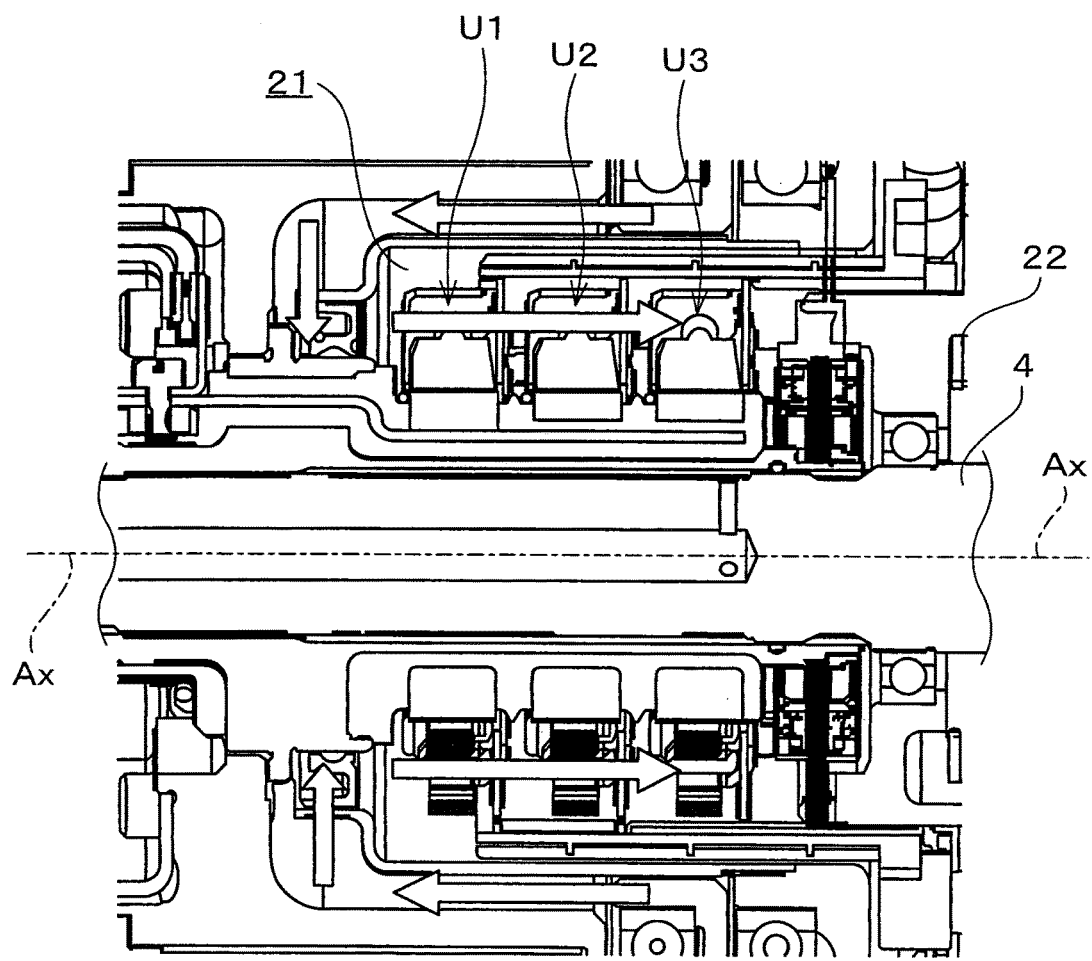
FIG. 9 is a sectional figure for explanation of this air flow.

As shown in FIG. 2, the units U1 through U3 are mutually insulated from one another by being covered over with a cover 20 made from resin. And a cooling passage 21 is formed between the units U1 through U3 and the cover 20. As shown by the arrow signs in FIGS. 8 and 9, the units U1 through U3 are cooled by air flowing along this cooling passage 21 in the direction from the first unit U1 via the second unit U2 toward the third unit U3. Although this feature is not shown in the figure, air is supplied to the cooling passage 21 via a supply passage that leads to the exterior. As shown in FIG. 9, a fan 22 that rotates together with the input shaft 4 is provided at the downstream side of the cooling passage 21. When the input shaft 4 rotates, the fan 22 rotates therewith and lowers the pressure at the downstream side of the cooling passage 21 (i.e. at the right side of FIG. 9). Due to this, external air is forcibly sucked into the cooling passage 21 via the supply passage mentioned above. The cooling passage 21, the fan 22, and the supply conduit constitute the "cooling device" of the Claims of this application.

Figure 10:
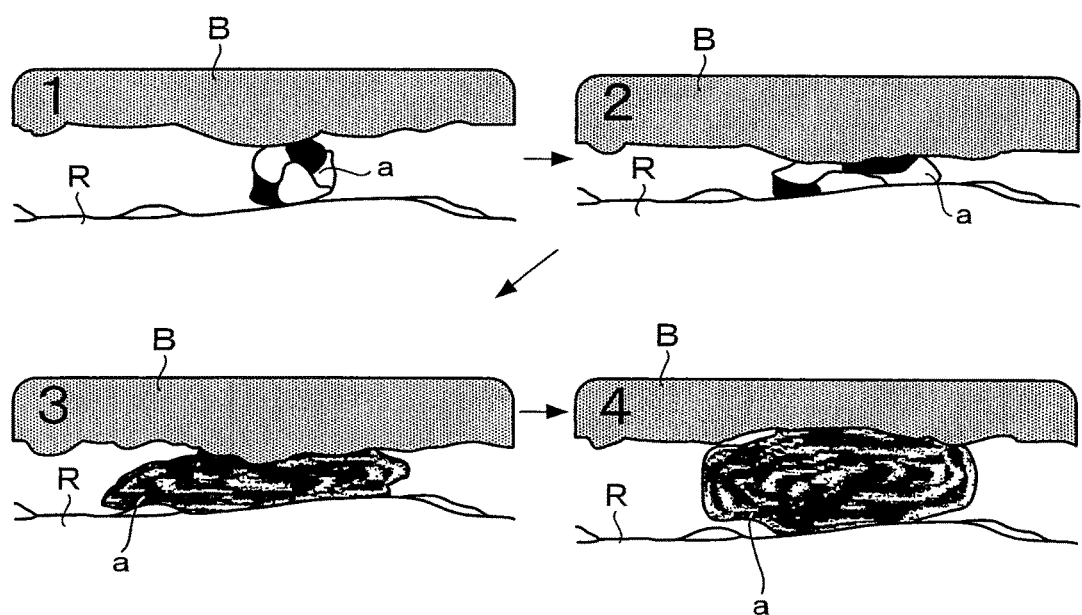
FIG. 10 is a figure showing a process of wear powder growth.

A portion of the wear powder that is generated by each of the units U1 through U3 is carried to flow down through the cooling passage 21 by the air therein and is discharged to the exterior. The remaining wear powder is captured in the dimples formed on the ring members 10a through 10c of the units U1 through U3. Generally, when wear powder present at a sliding surface between a ring member and a brush is observed microscopically, it is found that the wear powder grows via processes like those shown in FIG. 10. When, in the first process #1 of FIG. 10, wear powder a is generated by sliding between a brush B and a ring member R, in the next process #2 the wear powder a is squashed and is widened into a flattened shape. And in the next process #3 more wear powder agglutinates to this mass of wear powder a that has been squashed, so that the mass grows. Then in the process #4 the wear powder mass a, which has become quite large due to the above agglutination, grows further by capture while shaving away the brush B. The mass a of wear powder that has initially grown continues to grow by the same process. Accordingly, wear upon the brush B is promoted due to growth of the wear powder.

In this slip ring device 5, the plurality of dimples 15 are formed in the ring members 10a through 10c and are capable of accumulating the wear powder. Due to this, before the wear powder that has been generated shaves away the brush as described above, at least a portion thereof is captured in the dimples 15. The portion of the wear powder that is captured in the dimples 15 does not interfere with the brushes 12a through 12c. Accordingly, the wear powder that is captured in the dimples 15 is stopped from growing according to the above process #1 of FIG. 10. Therefore, in this slip ring device 5, the growth of the wear powder is suppressed, as compared to the case in which the dimples 15 are not formed. Due to this, it is possible to suppress wear upon the brushes 12a through 12c, since promotion of wear upon the brushes 12a through 12c is hindered. Furthermore, it is possible to prevent the dimples 15 from becoming filled with wear powder, since the wear powder that is captured by the dimples 15 is blown away to an exterior of the dimples 15 by the air flowing in the cooling passage 21.

(Embodiment #2)

Figure 11:
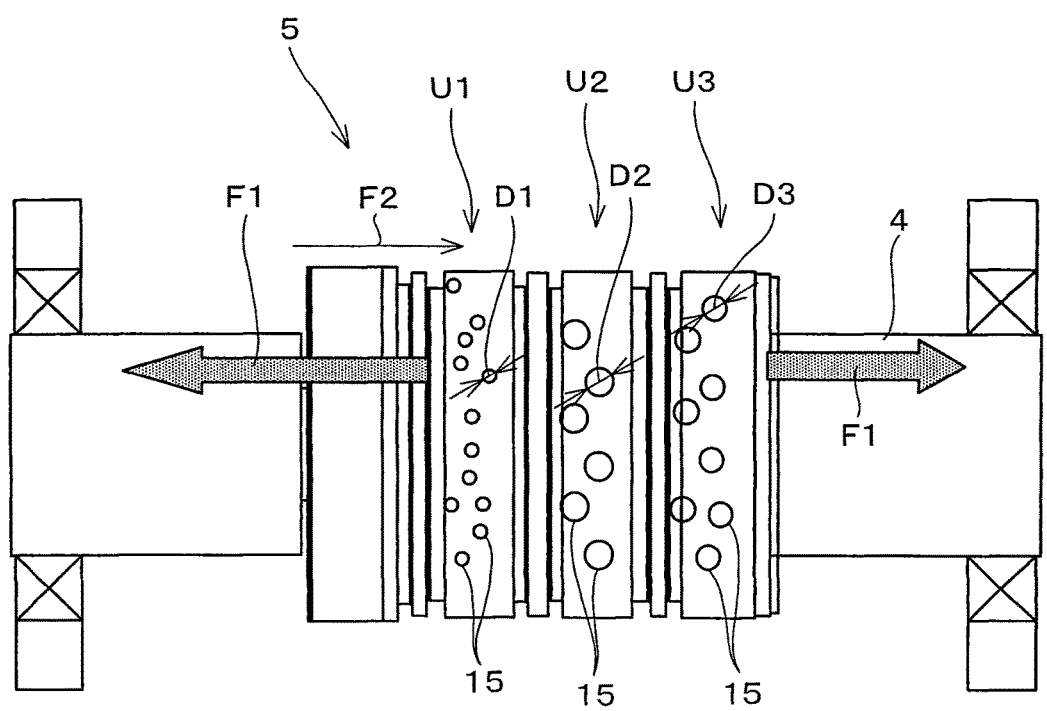
FIG. 11 is a figure schematically showing ring members of a slip ring device according to a second embodiment, and the surfaces thereof.
Figure 12:
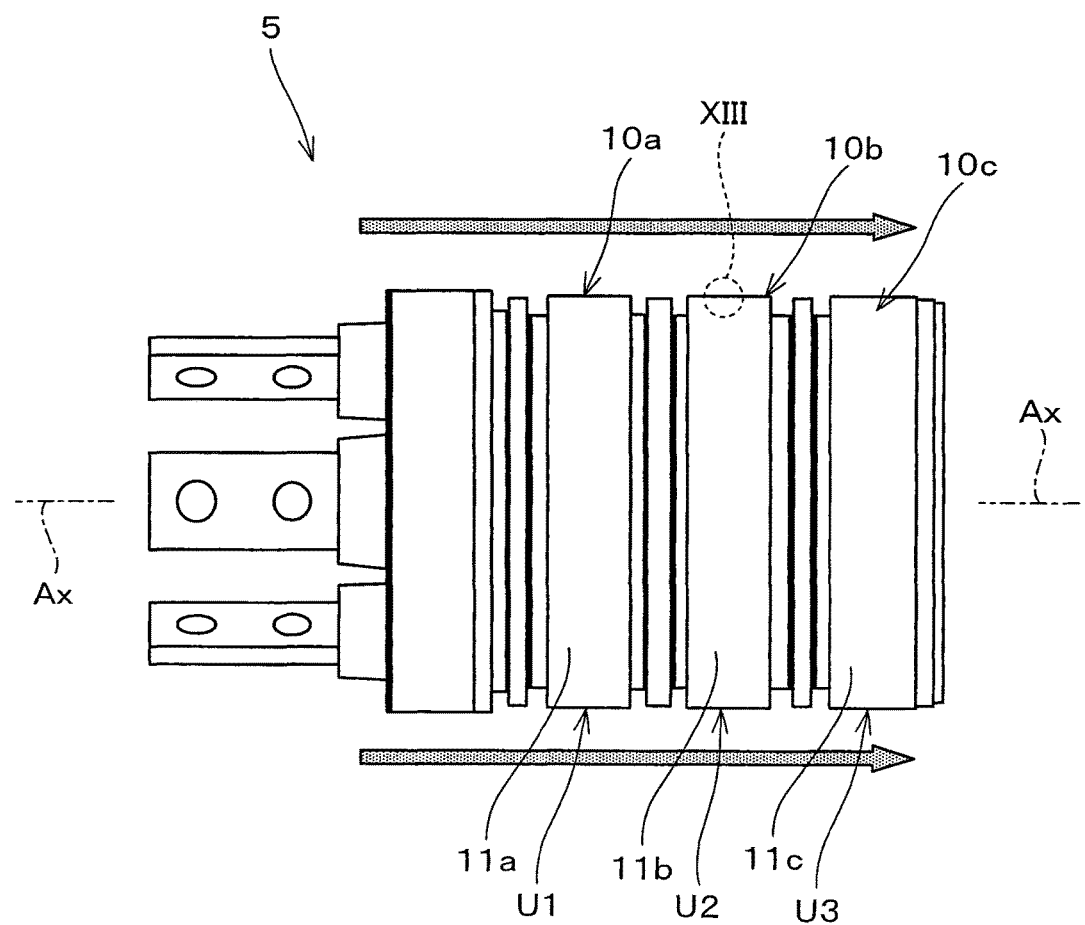
FIG. 12 is a figure showing ring members of a slip ring device according to a third embodiment.
Figure 13:
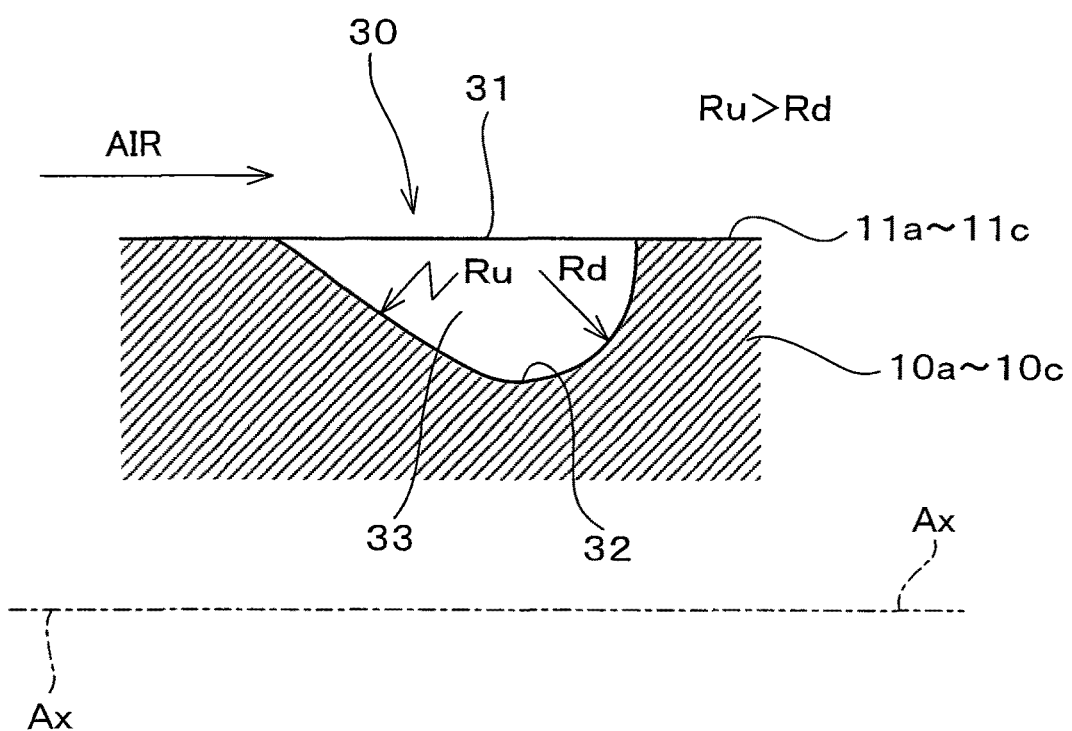
FIG. 13 is an enlarged sectional view schematically showing a cross section of a portion XIII of FIG. 12.

Next, a second embodiment will be explained with reference to FIG. 11. This second embodiment is the same as the first embodiment, except for the magnitudes of the dimple diameters. In the following, this aspect of difference from the first embodiment will be explained. While, in the first embodiment the dimple diameter was the same for all the units U1 through U3, in this second embodiment, if the dimple diameter in the first unit U1 is denoted by D1, the dimple diameter in the second unit U2 is denoted by D2, and the dimple diameter in the third unit U3 is denoted by D3, then the relationship D1<D3<D2 holds.

When the input shaft 4 rotates due to operation of this composite motor 1, heat is generated between the ring members 10a through 10c and the corresponding brushes 12a through 12c due to friction (refer to FIG. 1). Since the peripheral environments of the units U1 through U3 are not uniform, accordingly the temperatures of the units U1 through U3 do not perfectly agree with one another. Accordingly, temperature differences are set up between the various units U1 through U3. Heat can more easily be retained in the second unit U2, because it is sandwiched between the first unit U1 and the third unit U3. The heat generated in each of the first unit U1 and the third unit U3 is transmitted to the surrounding member as shown by the arrow signs F1 in FIG. 11. Moreover, since the air passing down the cooling passage 21 (refer to FIG. 8 and so on) flows in the direction of the arrow sign F2 in FIG. 11, accordingly, after having performed heat exchange with the first unit U1, the warmed air flows to the second unit U2. And, since the first unit U1 is cooled by air at a lower temperature than the air that cools the third unit U3, accordingly the third unit U3 can easily reach a high temperature, as compared to the first unit U1. Therefore, if the temperature of the first unit U1 is denoted by T1, the temperature of the second unit U2 is denoted by T2, and the temperature of the third unit U3 is denoted by T3, the relationship T1<T3<T2 holds.

It is known that, generally, the size of the wear powder is proportional to the surface temperature of the brush. Accordingly, the size of the wear powder generated by the second unit U2 is the largest, and moreover the size of the wear powder generated by the third unit U3 is larger than the size of the wear powder generated by the first unit U1. In this second embodiment, the relationship between the magnitudes of the dimple diameters of the units U1 through U3 corresponds to the relationship between the sizes of the wear powders. Due to this, the disparities between the amounts of wear powder (i.e. the numbers of particles thereof) that can be captured by the dimples 15 of each of the units U1 through U3 are reduced. Accordingly, the unevenness between the units U1 through U3 of the progression of brush wear is reduced. Due to this, it becomes easy to manage the brush wear of the units U1 through U3. Moreover, the wear powder that is generated by the first unit U1 is discharged by the air flowing down through the cooling passage 21, and there is a possibility that this wear powder may enter into the second unit U2 or the third unit U3. However, the wear powder generated by the first unit U1 is smaller than the wear powder generated by the other units, and moreover the dimple diameter of the second unit U2 and the dimple diameter of the third unit U3 are larger than the dimple diameter of the first unit U1. Due to this, the wear powder that is discharged from the first unit U1 and that has entered into the second unit U2 or the third unit U3 can be captured by the dimples 15 of the second unit U2 or the third unit U3. Accordingly, with this second embodiment, it is difficult for the brush wear in any one of the units to experience any influence from the wear powder generated in another of the units.

(Embodiment #3)

Next, a third embodiment will be explained with reference to FIGS. 12 through 16. This third embodiment is one that relates to the shape of the dimples; and the shape of the dimples in this third embodiment could also be applied to the first embodiment or to the second embodiment. The dimple 30 shown in FIG. 13 has an opening portion 31 and a bottom portion 32, and also has an inner wall 33 that is shaped as a curved surface from the opening portion 31 to the bottom portion 32. The curvature of this inner wall 33 is not uniform with respect to the direction of the axis Ax. In more concrete terms, the curvature of this inner wall 33 at the upstream side of the air flow direction as shown by the arrow sign in FIG. 13 (i.e. the left side in FIG. 13) is formed so as to be smaller, as compared to its curvature at the downstream side (i.e. the right side in FIG. 13). To put it in another manner, the inner wall 33 is formed so that its radius of curvature Ru of at the upstream side of the air flow direction is larger than its radius of curvature Rd at the downstream side.

Figure 14:
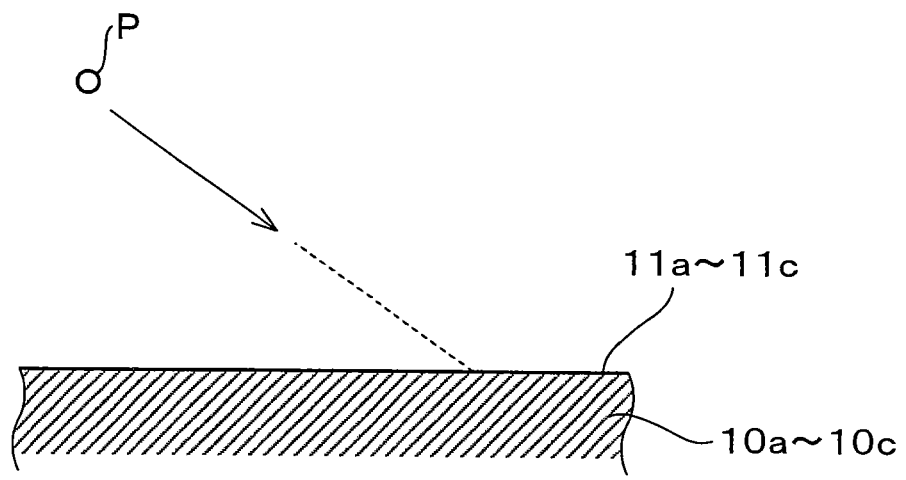
FIG. 14 is an explanatory figure for explanation of a processing method for manufacturing the dimple shown in FIG. 13.
Figure 14:
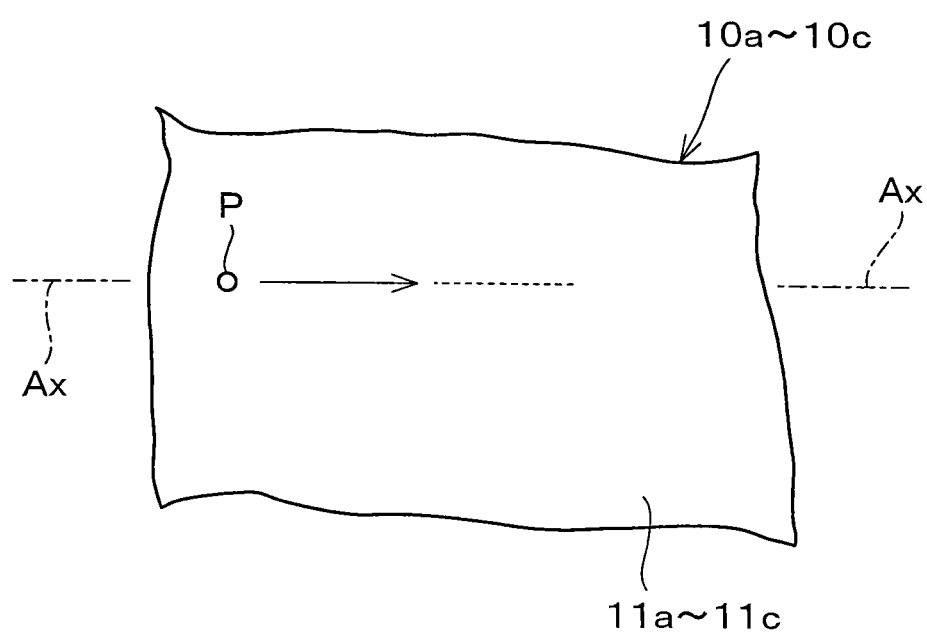

The dimple 30 is formed using the shot peening method, as shown in FIG. 14, by causing a particle P to collide against the surface 11a through 11c of the ring member 10a through 10c. In other words, the direction of projection of the particle P is set to a direction that is slanted with respect to the direction of the axis Ax. Due to this, the dimple 30 can be formed to have the characteristic shape shown in FIG. 13. It should be understood that the dimple 30 could also be formed by a laser processing method. In this case, similarly to the method of FIG. 14, the direction of irradiation by the laser would be set to be slanted with respect to the direction of the axis Ax.

Figure 15:
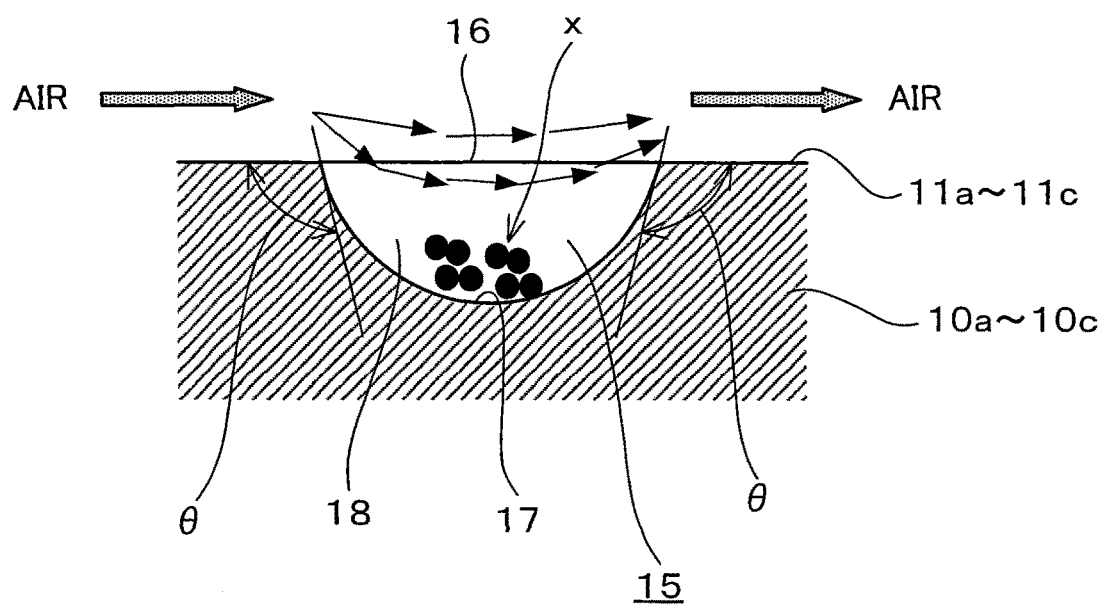
FIG. 15 is an explanatory figure showing the state of air flow around the dimples according to the first embodiment or the second embodiment.

As shown in FIG. 15, since the curvature of the inner wall 18 of the dimple 15 according to the first embodiment or the second embodiment is the same at the upstream side of the air flow direction shown by the arrow sign and at its downstream side, accordingly the angles θ defined between the surface 11a through 11c of the ring member 10a through 10c and the inner wall 18 are the same at the upstream side and at the downstream side and moreover are both close to a right angle. Due to this, when the air flowing toward the dimple 15 reaches the opening portion 16 of the dimple 15, it separates at the edge of the opening portion 16 and does not easily reach as far as the bottom portion 17. Accordingly, it is difficult for the wear powder x that has been captured in the dimple 15 to be ejected by the air flow, and there is a possibility that a lot of the wear powder x may pile up in the dimple 15. Due to this there is a possibility that, in specific operational conditions, a large quantity of the wear powder x may be discharged from the dimple 15 over a short time interval, and that this ejected wear powder x may enter into the sliding area between the brush and the ring member and grow there.

Figure 16:
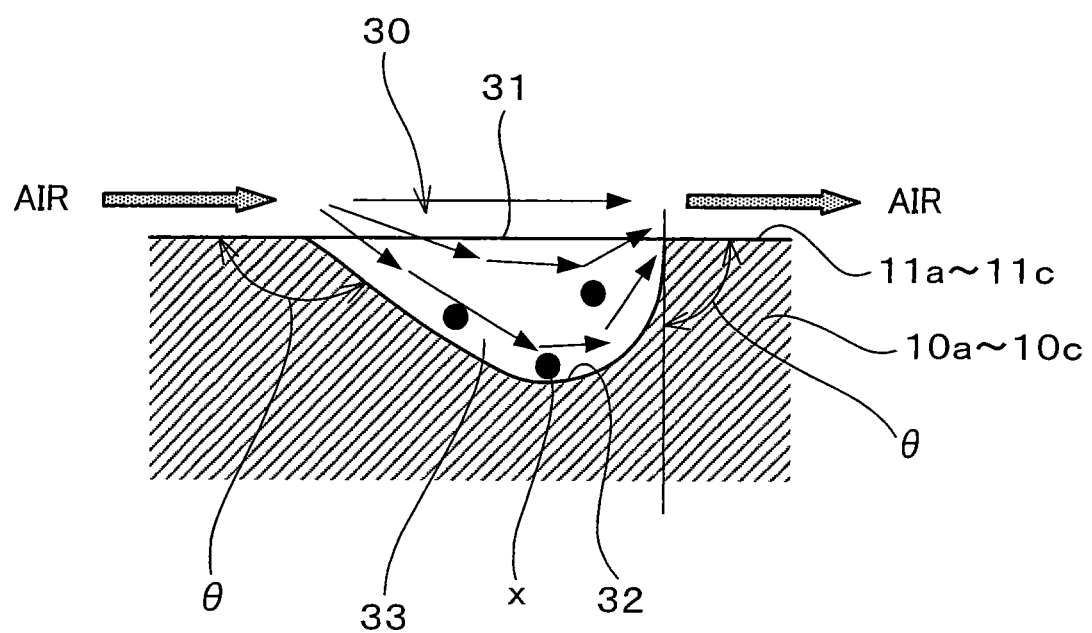
FIG. 16 is an explanatory figure showing the state of air flow around the dimples according to the third embodiment.

However, as described above, since the curvature of the inner wall 33 of the dimple 30 of the present embodiment is smaller at the upstream side of the air flow direction as compared to its downstream side, accordingly the angle θ defined between the surface 11a through 11c of the ring member 10a through 10c and the inner wall 33 is greater at the upstream side as compared to the downstream side, and moreover is greater than a right angle. Due to this, as shown in FIG. 16, the air flowing toward the dimple 30 does not easily separate at the edge of the opening portion 31, and easily reaches as far as the bottom portion 32. Accordingly, wear powder x that has been captured in the dimple 30 and has accumulated at its bottom portion 32 can easily be ejected. Since, due to this, the wear powder x is discharged by the air before a large quantity thereof can accumulate, accordingly it is possible to avoid a situation occurring in which a large amount of the wear powder x is ejected over a short time interval.

The present invention is not limited to the embodiments described above; it can be implemented in various different ways without departing from the scope of its gist. Moreover, the subject of application of the slip ring device of the present invention is not limited to being a composite motor. Accordingly, the slip ring device of the present invention may also be applied to an electric motor, a generator, or a motor-generator of any type that requires transmission of electricity to a rotor that is provided upon a rotation shaft.

The slip ring device of the present invention is not limited to an embodiment that is made up of a plurality of units; it can also be implemented in a form that consists of a single unit that includes, at least, a single ring member and a single brush. Furthermore, the provision of a cooling device that cools the ring member and the brush by the flow of air is not essential; the present invention could also be implemented in a form in which no such cooling device is provided.

The shape of the dimples is not particularly limited, since it will be sufficient for it to be possible for the wear powder to be accumulated by the dimples. Moreover, it would also be acceptable for all of the dimples not to have the same shape. It would also be acceptable for formation of the dimples to be performed by some other method, rather than by the shot peening method or the laser processing method described above. For example, it would be possible to prepare a die having a plurality of projections that are shaped to correspond to the dimples, and to form the dimples by pressing this die against the surface of the ring member.

The invention claimed is:

1. A slip ring device that is applied to a rotating electrical machine including a rotation shaft, and comprising:
a ring member that rotates along with the rotation shaft of the rotating electrical machine; and
a brush that contacts against the ring member, wherein the ring member includes a surface that contacts against the brush,
a plurality of dimples are formed on the surface,
at least one of the plurality of dimples includes a size that can accommodate wear powder generated by friction between the ring member and the brush, and
when each of the plurality of dimples is considered as including an opening portion that includes a same aperture area and that moreover opens to the surface in a circular shape, and a diameter of the opening portion is defined as being a dimple diameter, then:
a first unit, a second unit, and a third unit are provided, each including one of the ring member and one of the brush, and moreover, in order along an axial direction of the rotation shaft, these units are arranged upon the rotation shaft in the order of the first unit, the second unit, and the third unit, and
the dimple diameter of the ring member included in the second unit is larger than the dimple diameter of the ring member included in the first unit, and moreover is larger than the dimple diameter of the ring member included in the third unit.

2. A slip ring device according to claim 1, wherein the dimple diameters of the ring members included in each of the first unit, the second unit, and the third unit are set within a range of from ten times to a hundred times an average particle diameter of the wear powder.

3. A slip ring device according to claim 1, further comprising a cooling device that flows air in a direction from the first unit via the second unit toward the third unit and cools the first unit, the second unit, and the third unit, and wherein the dimple diameter of the ring member included in the first unit is smaller than the dimple diameter of the ring member included in the third unit.

4. A slip ring device that is applied to a rotating electrical machine including a rotation shaft, and comprising:
a ring member that rotates along with the rotation shaft of the rotating electrical machine;
a brush that contacts against the ring member; and
a cooling device that flows air in an axial direction of the rotation shaft and cools the ring member and the brush, wherein
the ring member includes a surface that contacts against the brush,
a plurality of dimples are formed on the surface,
at least one of the plurality of dimples includes an opening portion, a bottom portion, and an inner wall that is formed in a shape of a curved surface from the opening portion to the bottom portion, and moreover
a curvature of the inner wall from the opening portion to the bottom portion is formed so as to be smaller at an upstream side of a flow direction of air flowed by the cooling device, as compared to a downstream side.

* * * * *